(12) United States Patent
Vauchel

(10) Patent No.: US 9,109,540 B2
(45) Date of Patent: Aug. 18, 2015

(54) AIRPLANE JET ENGINE THRUST REVERSER HAVING GRATINGS OR CASCADES

(71) Applicant: AIRCELLE, Gonfreville l'Orcher (FR)

(72) Inventor: Guy Bernard Vauchel, Harfleur (FR)

(73) Assignee: AIRCELLE, Gonfreville L'Orcher (FR)

( * ) Notice: Subject to any disclaimer, the term of this patent is extended or adjusted under 35 U.S.C. 154(b) by 0 days.

(21) Appl. No.: 13/681,210

(22) Filed: Nov. 19, 2012

(65) Prior Publication Data
US 2013/0075493 A1   Mar. 28, 2013

Related U.S. Application Data

(63) Continuation of application No. PCT/FR2011/051046, filed on May 10, 2011.

(30) Foreign Application Priority Data

May 17, 2010 (FR) ..................... 10 53785

(51) Int. Cl.
F02K 1/56 (2006.01)
F02K 1/62 (2006.01)
(Continued)

(52) U.S. Cl.
CPC ............... *F02K 1/62* (2013.01); *F01D 11/005* (2013.01); *F02K 1/72* (2013.01); *F02K 1/56* (2013.01);
(Continued)

(58) Field of Classification Search
CPC ........... F02K 1/563; F02K 1/566; F02K 1/58; F02K 1/60; F02K 1/605; F02K 1/62; F02K 1/625; F02K 1/54; F02K 1/56; F02K 1/64; F02K 1/66; F02K 1/68; F02K 1/70; F02K 1/72; F02K 1/74; F02K 1/76; F02K 1/763; F02K 1/766; Y02T 50/671; B64C 9/34; B64C 9/36; B64C 9/38

USPC .......... 60/226.1, 226.2, 226.3, 228, 230, 771; 244/110 B; 239/265.13, 265.19, 239/265.23, 265.25, 265.27, 265.29, 239/265.31, 265.33, 265.35, 265.37, 239/265.39, 265.41, 265.43

See application file for complete search history.

(56) References Cited

U.S. PATENT DOCUMENTS 3,262,268 A * 7/1966 Beavers ........................ 60/226.2
3,698,192 A * 10/1972 Le Febvre, Jr. ................. 60/232
(Continued)

FOREIGN PATENT DOCUMENTS

BE         682002     11/1966
FR         2379705    9/1978
(Continued)

OTHER PUBLICATIONS

PCT/FR2011/051046 International Search Report.

*Primary Examiner* — Phutthiwat Wongwian
*Assistant Examiner* — Michael B Mantyla
(74) *Attorney, Agent, or Firm* — Brinks Gilson & Lione

(57) ABSTRACT

A cascade thrust reverser for an airplane dual flow jet engine nacelle is provided that includes a front frame holding a plurality of cascades, a cowling slidably mounted between a direct jet position and a reverse jet position. The cowl includes a substantially annular diaphragm that is placed edge-to-edge with the front frame and radially inside said cascades when said cowl is located in the direct jet position. Thrust reversal flaps are pivotably mounted onto the diaphragm, and cylinders for actuating the cowl are also provided. Upstream ends of the cylinders are mounted on a stationary portion of the nacelle, and the downstream ends of the cylinders are mounted on an upstream edge of the diaphragm.

3 Claims, 2 Drawing Sheets

(51) Int. Cl.
  *F01D 11/00* (2006.01)
  *F02K 1/72* (2006.01)
  *F02K 1/76* (2006.01)

(52) U.S. Cl.
  CPC ................ *F02K 1/566* (2013.01); *F02K 1/625* (2013.01); *F02K 1/763* (2013.01); *F05D 2240/55* (2013.01); *F05D 2250/34* (2013.01); *F05D 2250/41* (2013.01)

(56) References Cited

U.S. PATENT DOCUMENTS

| | | | | |
|---|---|---|---|---|
| 4,005,822 A | * | 2/1977 | Timms | 239/265.31 |
| 4,232,516 A | * | 11/1980 | Lewis et al. | 60/226.2 |
| 4,545,199 A | * | 10/1985 | Sankey et al. | 60/226.2 |
| 4,716,724 A | * | 1/1988 | Newton | 60/226.2 |
| 4,731,991 A | * | 3/1988 | Newton | 60/226.2 |
| 5,778,659 A | * | 7/1998 | Duesler et al. | 60/226.1 |
| 5,853,148 A | * | 12/1998 | Standish et al. | 244/110 B |
| 5,975,237 A | * | 11/1999 | Welch et al. | 181/290 |
| 6,000,216 A | * | 12/1999 | Vauchel | 60/226.2 |
| 6,045,091 A | * | 4/2000 | Baudu et al. | 244/110 B |
| 8,443,585 B2 | * | 5/2013 | Stern | 60/226.2 |
| 2010/0037587 A1 | * | 2/2010 | Vauchel et al. | 60/226.2 |
| 2010/0044466 A1 | * | 2/2010 | Vauchel et al. | 239/265.11 |

FOREIGN PATENT DOCUMENTS

| | | |
|---|---|---|
| FR | 2588312 | 4/1987 |
| FR | 2914957 | 10/2008 |
| FR | 2920197 | 2/2009 |

\* cited by examiner

AIRPLANE JET ENGINE THRUST REVERSER HAVING GRATINGS OR CASCADES

CROSS-REFERENCE TO RELATED APPLICATIONS

This application is a continuation of International Application No. PCT/FR2011/051046 filed on May 10, 2011, which claims the benefit of FR 10/53785, filed on May 17, 2010. The disclosures of the above applications are incorporated herein by reference.

FIELD

The present disclosure relates to an airplane jet engine thrust reverser having gratings or cascades.

BACKGROUND

The statements in this section merely provide background information related to the present disclosure and may not constitute prior art.

An airplane is moved by several turbojet engines each housed in a nacelle also housing a set of related actuating devices connected to its operation and performing various functions when the turbojet engine is running or stopped. These related actuating devices in particular comprise a mechanical thrust reversal system.

More specifically, a nacelle generally has a tubular structure comprising an air intake upstream of the turbojet engine, a middle section designed to surround a fan of the turbojet engine, a downstream section housing the thrust reverser means and designed to surround the combustion chamber of the turbojet engine, and generally ends with a jet nozzle whereof the outlet is situated downstream of the turbojet engine.

Modern nacelles are designed to house a dual flow turbojet engine capable of generating, via the rotating fan blades, a flow of warm air (also called primary flow) coming from the combustion chamber of the turbojet engine, and a flow of cool air (secondary flow) that circulates outside the turbojet engine through an annular channel, also called tunnel, formed between fairing of the turbojet engine and an inner wall of the nacelle. The two flows of air are discharged from the turbojet engine through the rear of the nacelle.

During landing of an airplane, the role of a thrust reverser is to improve the braking capacity of that airplane by reorienting at least part of the thrust created by the turbojet engine forward. In this phase, the reverser obstructs the annular channel for the flow of cool air and orients the latter toward the front of the nacelle, thereby creating a counter-thrust that is added to the braking of the wheels of the airplane.

The means implemented to perform this reorientation of the flow of cool air vary depending on the type of reverser. However, in all cases, the structure of the reverser comprises cowls that can be moved between a deployed (or reverse jet) position, in which they open a passage in the nacelle designed for the deflected flow, on the one hand, and a retracted (or "direct jet") position, in which they close that passage.

In the case of a reverser with gratings, also known as a cascade reverser, the reorientation of the flow of air is done by cascades, the cowl being slidingly mounted along the axis of the nacelle so as to expose or cover those gratings. Complementary blocking doors, also called reverser flaps, activated by the sliding of the cowling, generally allow closing of the annular cool air flow channel downstream of the gratings so as to optimize the reorientation of that flow of air.

The sliding of the moving cowl between its "direct jet" and "reverse jet" positions is ensured by cylinders distributed on the periphery of the nacelle.

Traditionally, the cylinders are fastened upstream on a stationary part of the nacelle, such as the front support frame of the cascades, and downstream inside the moving cowl, using adapted fittings.

More specifically, the actuating rods of the cylinders pass through the rear support frame of the cascades to cooperate with the moving cowl.

This necessarily means that the rear frame of the cascades has a certain radial bulk.

However, in modern nacelles, where efforts are made to reduce aerodynamic losses due to wet surfaces, the lines are increasingly compact, and it is particularly important to be able to reduce the radial thickness of the rear frame.

SUMMARY

The present disclosure in particular aims to provide means making it possible to reduce the thickness of the rear support frame of the cascades.

A cascade thrust reverser for an airplane dual flow jet engine nacelle is provided by the present disclosure that includes:
  a front frame holding a plurality of cascades,
  a cowling slidably mounted between a direct jet position, in which it covers said cascades, and a reverse jet position, in which the cowl uncovers said cascades, said cowl including a substantially annular diaphragm that is placed edge-to-edge with said front frame and radially inside said cascades when said cowl is located in a direct jet position,
  thrust reversal flaps that are pivotably mounted onto said diaphragm between a direct jet position, in which they enable the flow of cool air downstream from the thrust reverser, and a reverse jet position, in which they direct the cool air to said cascades, and
  cylinders for actuating said cowl between the direct and reverse jet positions thereof,
  this thrust reverser being remarkable in that the upstream ends of said cylinders are intended to be mounted on a stationary portion of said nacelle, and in that the downstream ends of said cylinders are mounted on the upstream edge of said diaphragm.

Owing to these features, the cylinders no longer need to pass through the rear support frame of the cascades, since the diaphragm is radially inside (i.e. under) that frame.

In this way, it is possible to reduce the thickness of the rear frame, and therefore to reduce the thickness of the moving cowl.

Furthermore, since the cylinders are located in the extension of the diaphragm, the bulk is thus not increased in the zone located radially inside (i.e. under) that diaphragm.

It should also be noted that the arrangement according to the invention is also suitable when the cascades are self-supporting, i.e. when there is no frame, and the cascades are only fastened to each other and on the front frame.

According to other optional features of this thrust reverser according to the invention:
  said cylinders are situated under said cascades;
  said cylinders are situated between said cascades;
  the axes of said cylinders are situated aligned with said diaphragm: this particular arrangement allows improved distribution of forces;

said diaphragm has an upstream edge folded toward the inside of the nacelle, supporting fittings for fastening the downstream ends of said cylinders;

the upstream edge also bears a sealing ring that can be pressed against said front frame when said moving cowl is in the direct jet position, advantageously under the cylinders;

said front frame has an annular groove provided with a seal, and the upstream edge of said diaphragm has a skirt capable of fitting into that groove when said moving cowl is in the direct jet position; and said front frame has cavities capable of receiving the downstream ends of said cylinders, and at least part of said fittings, when said moving cowl is in the direct jet position.

The present disclosure also relates to a nacelle incorporating a thrust reverser according to the preceding.

Further areas of applicability will become apparent from the description provided herein. It should be understood that the description and specific examples are intended for purposes of illustration only and are not intended to limit the scope of the present disclosure.

DRAWINGS

Other features and advantages of the present invention will appear in light of the following description, and upon examining the appended figures, in which.

Figure 1:
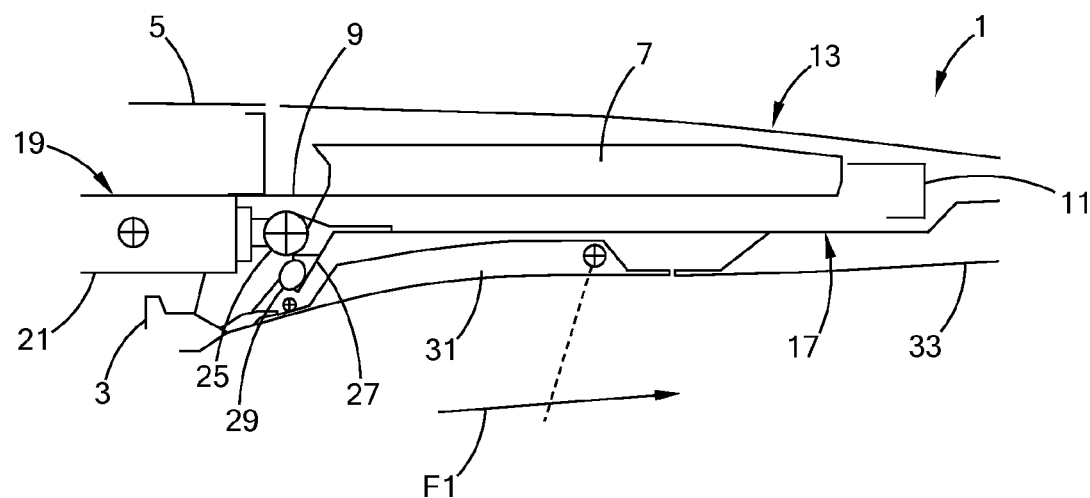
FIG. 1 shows, in axial cross-section, the zone of the reverser cascades of a thrust reverser according to the invention, when the reverser is in the direct jet position.

In all of these figures, identical or similar references designate identical or similar members or sets of members.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Figure 2:
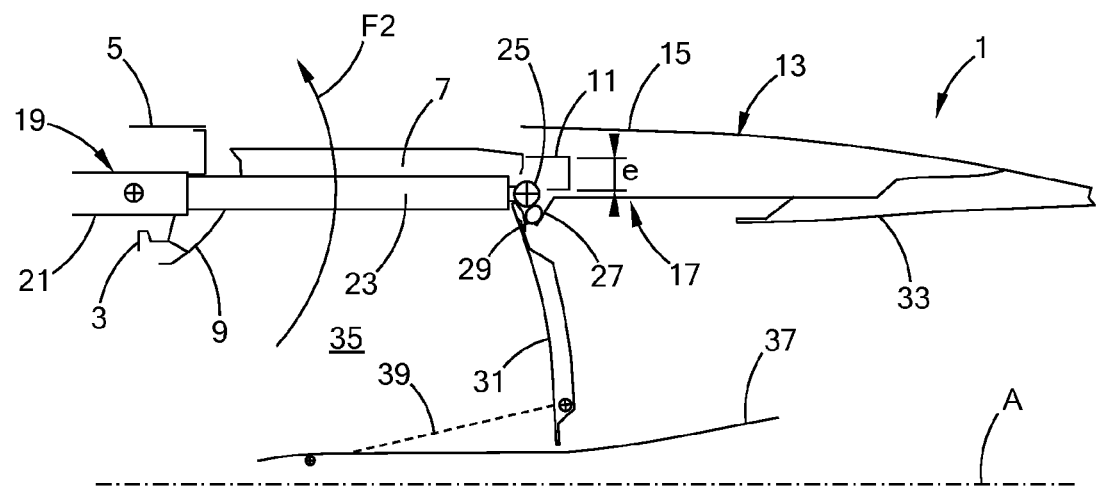
FIG. 2 shows the reverser in the reverse jet position.

Reference will first be made to FIGS. 1 and 2, which show a cascade thrust reverser according to the invention, arranged downstream of the fan case 3 of a dual flow turbojet engine, and the associated fan shroud 5.

This thrust reverser according to the invention has a plurality of cascades 7, fastened between a front frame 9 and a stationary rear frame 11.

A moving cowl 13, having an outer panel 15 and an inner diaphragm 17, is slidingly mounted between a position in which the panel and the diaphragm cover the cascades 7 (FIG. 1), and a reverse jet position, in which the panel 15 and the diaphragm 17 uncover said cascades 7 (FIG. 2).

The moving cowl 13 is actuated between these two positions by a plurality of cylinders 19 arranged on the periphery of the nacelle, and the body 21 of which is fastened upstream of the front frame 9, and the actuating rod 23 of which cooperates with the inner diaphragm 17 by means of a fitting 25.

More specifically, the inner diaphragm 17 has, in the upstream portion thereof, an edge 27 folded toward the inside of the nacelle, i.e. toward the axis A of the nacelle.

The upstream edge 27 of the diaphragm 17 supports a sealing ring 29 that can be pressed against the front frame 9 when the moving cowl 13 is in the direct jet position, as shown in FIG. 1.

A plurality of thrust reverser flaps 31 are also pivotably mounted on the diaphragm 17, between a direct jet position (FIG. 1) in which they produce the continuity and dynamics with the inner wall 33 of the moving cowl 13, and a reverse jet position (FIG. 2) in which they cover the cool air tunnel 35 delimited by the inner wall 33 of the moving cowl 13 and the fairing (often designated IFS: "Internal Fixed Structure") surrounding the motor of the turbojet engine (not shown).

It should be noted that the thrust reverser flaps 31 are actuated by link rods 39 inserted between said flaps and the fairing 37. Likewise, the concept may be adapted to any driving concept for the flaps without a link rod in the tunnel.

The operating mode and the advantages of the thrust reverser, the main elements of which have just been described, are as follows.

In a direct jet situation (FIG. 1), the cool air flow circulates inside the tunnel 35, following arrow F1, in the downstream direction of the nacelle, making it possible to produce the necessary thrust for flight of the airplane.

In the reverse jet position (FIG. 2), the rods 23 of the cylinders 19 leave the bodies 21 of the cylinders, making the moving cowl 13 slide in the downstream direction of the nacelle, which results on the one hand in uncovering the reverser cascades 13, and on the other hand in tilting the reverser flaps 31 toward a position in which they cover the cool air tunnel 35, under the action of the respective link rods 39.

This operation results in deflecting the cool air flow, circulating inside the tunnel 35 through the reverser cascades 7, toward the front of the nacelle, as indicated by arrow F2.

This deflection of air toward the front of the nacelle causes braking of the airplane, during landing.

The fact that the cylinders 19 are placed so that their actuating rods 23 cooperate with the inner diaphragm 17 of the moving cowl 13 makes it possible to do away with the need to have the rear frame 11 passed through by said rods 23, as was the case in the prior art.

In this way, it is possible to have a rear frame whereof the radial thickness E is minimal, given the lack of necessity to provide openings and scalloping in that frame.

It is even possible to consider completely doing away with such a frame, in the particular applications where the cascades 7 are self-supporting, i.e. fastened only to the front frame 9 and each other.

It will also be noted that the cooperation of the rods 23 of the cylinders 19 with the inner diaphragm 17 also avoids cluttering the space situated under (i.e. radially inside) that diaphragm with the rods.

As shown in FIG. 2, the geometry of the fittings 25 is studied so that in the direct jet position, they are placed just upstream of the rear frame 11, without interfering therewith.

In one form, the axis of said cylinders 19 is situated in the exact extension of the inner diaphragm 17, so as to ensure optimal distribution of forces.

As shown in FIG. 1, it is provided that the front frame 9 includes housings, i.e. openings capable of receiving the fitting 25 when the moving cowl 13 is in the direct jet position.

In this position, the seal 29, compressed between the upstream edge 27 and the front frame 9, makes it possible to guarantee complete sealing of the cool air tunnel 35 with respect to the outside, and thereby to avoid any loss of thrust.

Figure 3:
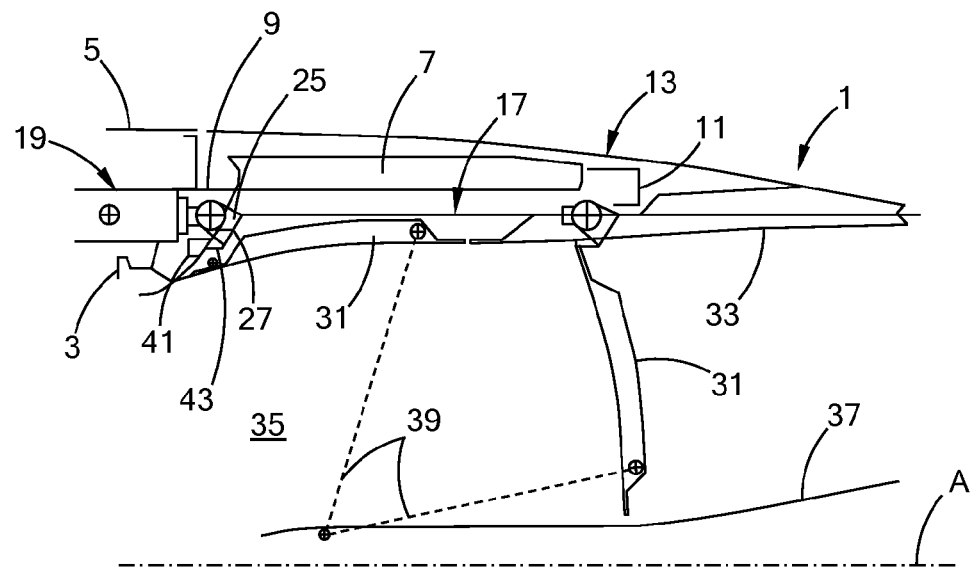
FIG. 3 shows another form of this reverser according to the present disclosure, respectively in the direct jet (solid lines) and reverse jet (broken lines) positions.

The form of FIG. 3 differs from the preceding embodiments essentially in that the sealing ring 29 is now arranged inside an annular groove formed inside the front frame 9, the upstream edge 27 of the inner diaphragm 17 in that case then including a skirt 43 capable of fitting into the groove 41, and therefore of compressing the seal 29, in the direct jet position.

Figure 4:
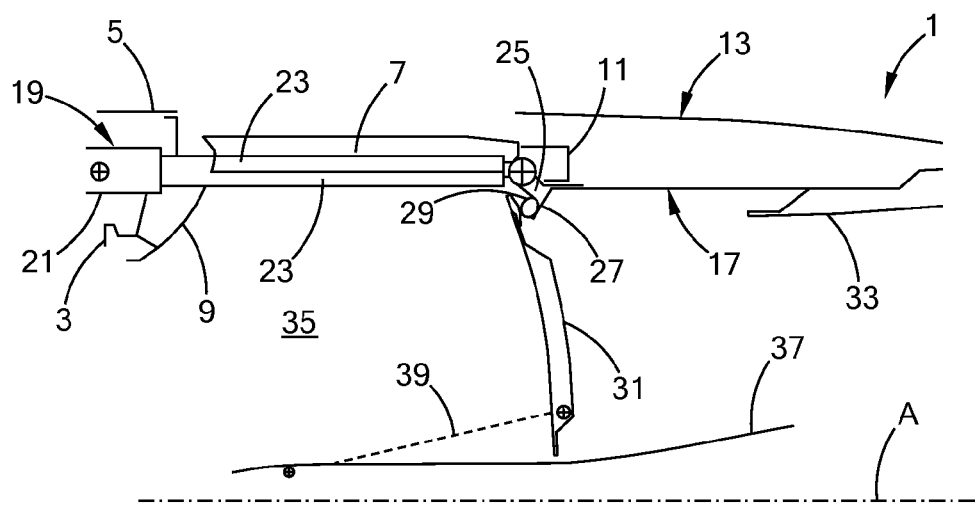
FIG. 4 shows still another form of the reverser according to the present disclosure, in the reverse jet position.

In the form of FIG. 4, one can see that the cylinder 19 may be arranged slightly more toward the outside of the nacelle, to the point that it interferes with the volume defined by the cascades 7: in that case, spaces are provided between the cascades 7, so as to allow the passage of the actuating rod 23 of the cylinder 19.

The fitting 25 is then of course configured so as to allow correct attachment of the end of the actuating rod 23 of the cylinder with the upstream edge 27 of the inner diaphragm 17.

Of course, the present disclosure is in no way limited to the embodiments described and shown, provided solely as examples. The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A cascade thrust reverser for an airplane dual flow jet engine nacelle, comprising:
    a front frame holding a plurality of cascades and having cavities;
    a cowl slidably mounted between a direct jet position, in which it covers said cascades, and a reverse jet position, in which it uncovers said cascades, said cowl including a substantially annular diaphragm that is placed edge-to-edge with said front frame and radially inside said cascades when said cowl is located in the direct jet position;
    thrust reversal flaps that are pivotably mounted onto said diaphragm between the direct jet position, in which the thrust reversal flaps enable a flow of cool air downstream from the thrust reverser with an inner wall of said cowl, and the reverse jet position, in which the thrust reversal flaps direct the cool air to said cascades; and
    cylinders situated under said cascades, said cylinders for actuating said cowl between the direct and reverse jet positions thereof, wherein upstream ends of said cylinders are mounted on a stationary portion of said jet engine nacelle, and downstream ends of said cylinders are mounted on an upstream edge of said diaphragm,
    wherein axes of said cylinders are aligned with said diaphragm, and the upstream edge of the diaphragm is folded toward the inside of the jet engine nacelle and the cavities of the front frame receive the downstream ends of said cylinders and at least part of support fittings of the diaphragm when said cowl is in the direct jet position,
    wherein said front frame has an annular groove provided with a seal, and the upstream edge of said diaphragm has a skirt capable of fitting into the annular groove when said cowl is in the direct jet position.

2. The cascade thrust reverser according to claim 1, characterized in that the upstream edge also bears a sealing ring that is pressed against said front frame when said cowl is in the direct jet position.

3. A nacelle for an airplane dual flow turbojet engine, incorporating a cascade thrust reverser according to claim 1.

* * * * *